(12) United States Patent
Guilera de Gispert et al.

(10) Patent No.: US 12,650,110 B2
(45) Date of Patent: Jun. 9, 2026

(54) LIGHTNING PROTECTION SYSTEM FOR SEGMENTED WIND TURBINE BLADES

(71) Applicant: Siemens Gamesa Renewable Energy Innovation & Technology, S.L., Sarriguren (ES)

(72) Inventors: Joan Pau Guilera de Gispert, Sarriguren (ES); Victor March Nomen, Sant Cugat del Valles (ES); Lukas Mathis, Kronshagen (DE); Lenz Simon Zeller, Felde (DE)

(73) Assignee: Siemens Gamesa Renewable Energy Innovation & Technology, S.L., Sarriguren (ES)

( * ) Notice: Subject to any disclaimer, the term of this patent is extended or adjusted under 35 U.S.C. 154(b) by 178 days.

(21) Appl. No.: 18/719,202

(22) PCT Filed: Dec. 7, 2022

(86) PCT No.: PCT/EP2022/084796
§ 371 (c)(1),
(2) Date: Jun. 12, 2024

(87) PCT Pub. No.: WO2023/117430
PCT Pub. Date: Jun. 29, 2023

(65) Prior Publication Data
US 2025/0059957 A1      Feb. 20, 2025

(30) Foreign Application Priority Data
Dec. 22, 2021    (EP) .................................... 21383191

(51) Int. Cl.
F03D 80/30 (2016.01)

(52) U.S. Cl.
CPC ........ F03D 80/30 (2016.05); F05B 2240/302 (2013.01)

(58) Field of Classification Search
CPC ........................... F03D 80/30; F05B 2240/302
See application file for complete search history.

(56) References Cited

U.S. PATENT DOCUMENTS

| | | | | |
|---|---|---|---|---|
| 7,922,454 B1 * | 4/2011 | Riddell | ................... | F03D 80/30 |
| | | | | 416/224 |
| 2014/0178205 A1 * | 6/2014 | Nanukuttan | ............ | B23P 11/00 |
| | | | | 29/889.71 |
| 2021/0239101 A1 * | 8/2021 | Bech | ..................... | F03D 1/0675 |

FOREIGN PATENT DOCUMENTS

| | | |
|---|---|---|
| CN | 105508131 A | 4/2016 |
| CN | 207609507 U | 7/2018 |
| EP | 1815137 A1 | 8/2007 |
| EP | 2243955 A2 | 10/2010 |
| EP | 3581790 A1 | 12/2019 |

OTHER PUBLICATIONS

PCT International Search Report and Written Opinion of International Searching Authority mailed Mar. 23, 2023 corresponding to PCT International Application No. PCT/EP2022/084796 filed Dec. 7, 2022.

* cited by examiner

*Primary Examiner* — Timothy J Thompson
*Assistant Examiner* — Amol H Patel
(74) *Attorney, Agent, or Firm* — Schmeiser, Olsen & Watts, LLP

(57) ABSTRACT
A lightning protection system for segmented wind turbine blades avoiding the lightning current to flow through the bolts of the metallic joint connecting the sections of the blade is provided.

10 Claims, 6 Drawing Sheets

LIGHTNING PROTECTION SYSTEM FOR SEGMENTED WIND TURBINE BLADES

CROSS-REFERENCE TO RELATED APPLICATIONS

This application is a national stage of PCT Application No. PCT/EP2022/084796, having a filing date of Dec. 7, 2022, claiming priority to EP application Ser. No. 21/383, 191.0, having a filing date of Dec. 22, 2021, the entire both contents of which are hereby incorporated by reference.

FIELD OF TECHNOLOGY

The following relates to lightning protection systems for blades of wind turbines. More specifically, the following relates to a lightning protection system for a segmented wind turbine blade.

BACKGROUND

It is known that wind turbine blades can be manufactured in sections that are assembled on the site of the wind turbine. In this manner, transport of the wind turbine is simplified and sites where it is not viable to transport large blades can be accessed. Blade sections can be assembled by chemical joints using adhesives or mechanical joints using bolts which is a more robust and appropriate solution for onsite assembly.

For example, EP1815137A1 shows a system for mechanically joint blade sections. The blade comprises a first blade section, a second blade section and a metallic joint. The rear end of the first blade section is attached to the front of the metallic joint with a first group of bolts and the front end of the second blade section is attached to the rear of the metallic joint with a second group of bolts.

On the other hand, blades of wind turbines are vulnerable to being hit by lightning. Therefore, all blades have a lightning protection system that comprises receptors placed in the area closest to the tip of the blade, that are joined by a lightning down conductor that descends through the interior of the blade to a system that is located in the hub or blade root of the wind turbine, which guides the lightning current to the base of the wind turbine, without the great energy of the lightning causing damages to the structure of the blade.

A typical disadvantage of the segmented wind turbine blades having mechanical joints with bolts is that the metal elements of the joint directly affect the behavior of the blade when faced against lightning. The metallic joint may become a potential lightning attraction point, and therefore must be considered in the design of the lightning protection system, given that lightning current flowing through the bolts, could damage the bolted joint (generate points where cracks could start, damage to threaded joints, electric arcs between different metal elements, etc. . . . ).

EP2243955A2 shows a lightning protection system for protecting the mechanical joint of a segmented wind turbine blade against lightning current. As described above, the segmented blade comprises a first and second blade sections attached by a metallic joint with bolts. The first blade section has a first lightning down conductor extending from the front end to the rear end of the first blade section and the second blade section has a second lightning down conductor extending from the front end to the rear end of the second blade section. The lightning down conductors are connected between them by a fixture, which also connect the structural beam of each section of the blade. Thus, lightning current flows from the first to the second lightning down conductor directly through the fixture.

Additionally, the metallic joint having the bolts is covered by metallic fairings which are connected to the lightning down conductors through the fixture. Metallic fairings are placed in such a manner that they shield the metallic joint so that the electrical field is annulled in the metallic joint, thereby preventing the impact of lightning on the metal elements of the joint. In case lightning impacts the fairings, the lightning current is discharged to the lightning down conductors through the fixture, thus protecting the bolts of the metallic joint and also the metallic joint itself from lightning current flowing through. Documents CN 105 508 131 A and CN 207 609 507 U disclose alternative embodiments of segmented blades with integrated lightning down conductors.

However, due to structural requirements some segmented blades do not have the fixture connecting the beam and also the lightning down conductors of each section of the blade, thus the aim of embodiments of the invention is to provide an alternative path for the lightning current for the segmented wind turbine blades, while the bolts of the metallic joint remains protected from lightning current flowing through the bolts.

SUMMARY

An aspect relates to a lightning protection system for segmented wind turbines blades.

The lightning protection system may comprise a first blade section having a front end and a rear end, a second blade section having a front end and a rear end, and a metallic joint having a front flange and a rear flange. The rear end of the first blade section may be attached to the front flange of the metallic joint with a first group of bolts and the front end of the second blade section may be attached to the rear flange of the metallic joint with a second group of bolts.

The first blade section may have a first lightning down conductor extending from the front end to the rear end of the first blade section, and the second blade section may have a second lightning down conductor extending from the front end to the rear end of the second blade section. The first lightning down conductor may be electrically connected with the front flange of the metallic joint and the second lightning down conductor may be electrically connected with the rear flange of the metallic joint. Thus, a lightning current path may be established between the lightning down conductors through the metallic joint.

An important aspect of the lightning protection system according to embodiments of the present invention is that lightning currents flow from the first to the second lightning down conductor through the metallic joint. Prior art document EP2243955A2 uses a fixture for connecting the lightning down conductors between them, and also uses metallic fairings which cover the metallic joint and which are connected to the fixture. Embodiments of the invention use the metallic joint that connects the sections of the blade for transmitting the lightning current and therefore does not require to use a fixture for transmitting the current. Moreover, in the system of embodiments of the invention the lighting current flow through the metallic joint avoiding flowing through the bolts, because the metallic joint offers less electrical contact resistance and impedance than the bolts, so a metallic fairing covering the metallic joint is not required for protecting the bolts. The first metallic piece and the second metallic piece, a lightning current path is established between the lightning down conductors through the metallic pieces and the metallic joint. According to this, the electrical connection between the metallic joint and the lightning down conductors may be established by the metallic pieces, therefore, it is not necessary to weld electrical contacts directly onto the metallic joint, so the structural integrity of the metallic joint is not modified.

In an embodiment, the metallic joint may comprise several independent metallic parts. Each metallic part may have a front flange and a rear flange, wherein the front flange of each metallic part may be attached to the first blade section with a bolt of the first group of bolts, and wherein the rear flange of each metallic part may be attached to the second blade section with a bolt of the second group of bolts. The front flanges of the metallic parts may be electrically connected with the first metallic piece and the rear flanges of the metallic parts may be electrically connected with the second metallic piece. By doing this, the metallic pieces assure that the metallic parts of the metallic joint are equipotentialized, thus the same amount of current flow through each metallic part, minimizing the risk of having electric arcs between the parts.

In another example, the independent metallic parts of the metallic joint may be spaced from each other. This improves the structural properties of the metallic joint. Each set of metallic part and two bolts that connects the two sections of the blade may have a different structural behavior when the blade moves, thus if the metallic parts are not in contact between them, then the forces to which a metallic part is subjected are not transmitted to the other metallic parts of the joint.

In another example, the independent metallic parts may comprise two flanges with passing holes for attaching the bolts and two ribs connecting the two flanges.

In another example, the rear end of the first blade section may have a first group of inserts of conductive material for receiving the first group of bolts, and the front end of the second blade section may have a second group of inserts of conductive material for receiving the second group of bolts. The first metallic piece may be electrically connected with the first group of inserts, and the second metallic piece may be electrically connected with the second group of inserts. Thus, if the segmented blade has inserts of conductive material for receiving the bolts, as for example metallic inserts, or inserts made of carbon fiber composite material, the inserts are also electrically connected to the lightning down conductors via the metallic pieces, and also the inserts are equipotentialized. If the inserts are made of a non conductive material, for example glass fiber, no electrical connection is required for the inserts. Same applies if the bolts are directly inserted into the shells of the blade without using inserts.

In another example, each blade section may have an upper shell and a lower shell. The upper shells may be attached with an upper metallic joint and the lower shells with a lower metallic joint. The first lightning down conductor may be electrically connected with the front flange of a metallic joint and the second lightning down conductor with the rear flange of a metallic joint. The upper and lower metallic joints may be electrically connected between them. Thus, the two metallic joints of the blade are equipotentialized.

In another example, the first lightning down conductor may comprise four lightning down cables, two of them electrically connected with the front flange of the lower metallic joint, and the other two electrically connected with the front flange of the upper metallic joint. The second lightning down conductor may comprise other four lightning down cables, two of them electrically connected with the rear flange of the lower metallic joint, and the other two electrically connected with the rear flange of the upper metallic joint. The front flanges of the upper and lower metallic joints may be electrically connected between them, and the rear flanges of the upper and lower metallic joints may also be electrically connected between them. Thus, the lightning current flowing through the blade is better distributed.

In another example, each metallic piece may have two terminal points for establishing an electrical connection with the lightning down cables.

In another example, the two terminal points of each metallic piece may be misaligned with each other and shifted an equal distance with respect to the center of the metallic piece. Thus, the lightning current may be balanced in the metallic piece.

In another example, one of the two terminal points of a metallic piece may establish an electrical connection with a respective terminal point of another metallic piece. Thus, the same terminal point is used for connecting a lightning down cable and for connecting metallic pieces between them.

BRIEF DESCRIPTION

Some of the embodiments will be described in detail, with references to the following Figures, wherein like designations denote like members, wherein.

DETAILED DESCRIPTION

Blades of large dimension for wind turbines may have a modular design, meaning that they may be made of different sections that are attached to each other through mechanical joints. The joints may be metallic bolted joints incorporated into intermediate sections of the blade, which constitute a potential location for receiving lightning currents.

Lightning currents flowing through the bolts may produce damage at the threaded parts of the bolts by partially melting the threaded contact surfaces or by producing a lost in the preloaded threads, thus producing a modification on the mechanical properties of the mechanical joint. The aim of embodiments of the invention is therefore avoiding lightning currents to flow through the bolts which may damage the properties of the threaded bolts.

Figure 1:
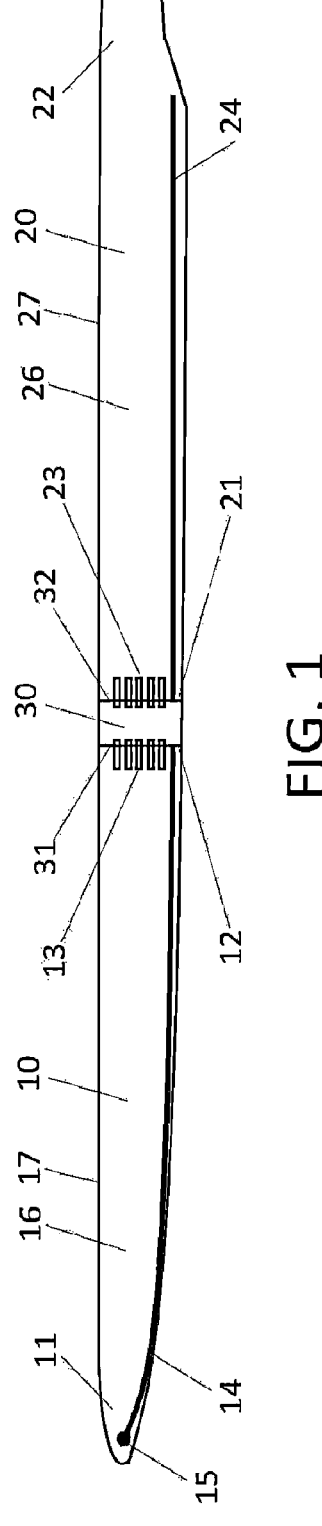
FIG. 1 shows a lightning protection system for a segmented wind turbine blade having two sections.

FIG. 1 shows an example of a lightning protection system for a segmented wind turbine blade. The segmented blade may comprise a first blade section 10, a second blade section 20, and a metallic joint 30 connecting the first blade section 10 with the second blade section 20.

The segmented blade may comprise more than two sections with a metallic joint 30 connecting consecutive sections of the segmented blade. For example, a three-part segmented blade may have three blade sections and two metallic joints.

According to the example of FIG. 1, the first blade section 10 may have a front end 11 and a rear end 12, the second blade section 20 may have a front end 21 and a rear end 22, and the metallic joint 30 may have a front flange 31 and a rear flange 32. The first blade section 10 may be attached to the front flange 31 of the metallic joint 30 with a first group of bolts 13 and the front end 21 of the second blade section 20 may be attached to the rear flange 32 of the metallic joint 30 with a second group of bolts 23.

As shown in the example of FIG. 1, the first blade section 10 may have a first lightning down conductor 14 extending from the front end 11 to the rear end 12 of the first blade section 10, and the second blade section 20 may have a second lightning down conductor 24 extending from the front end 21 to the rear end 22 of the second blade section 20.

The segmented blade may have lightning receptors 15 connected with the lightning down conductors 14 and 24. As shown in the example of FIG. 1, a lightning receptor 15 connected with the first lightning down conductor 14 may be placed at the tip of the blade where most lightning strikes occur. Depending on the site where the wind turbine is located or specific lightning protection system design, several lightning receptors 15 may be placed along the blade for attracting lightning.

According to embodiments of the invention, the first lightning down conductor 14 may be electrically connected with the front flange 31 of the metallic joint 30 and the second lightning down conductor 24 may be electrically connected with the rear flange 32 of the metallic joint 30, thus a lightning current path may be established between the lightning down conductors 14 and 24 through the metallic joint 30.

The metallic joint 30 have an electrical contact resistance and impedance lower than the bolts 13 and 23, thus lightning current may flow through the metallic joint 30 avoiding flowing through the bolts 13 and 23, or at least the current that may flow through the bolts is highly reduced, so no modification of the mechanical properties of the bolted joint established between the sections 10 and 20 occur due to lightning current.

For example, if a lightning impacts on the lightning receptor 15 placed closed to the tip, the lightning current descends through to the first lightning down conductor 14, then flow through the metallic joint 30 avoiding flowing through the bolts 13 and 23, and then descend through the second lightning down conductor 24 to a system located on the hub of the wind turbine, which guides the lightning current to the base of the wind turbine. So, no lightning current flows through the threaded parts of the bolts avoiding damaging them.

Figure 2:
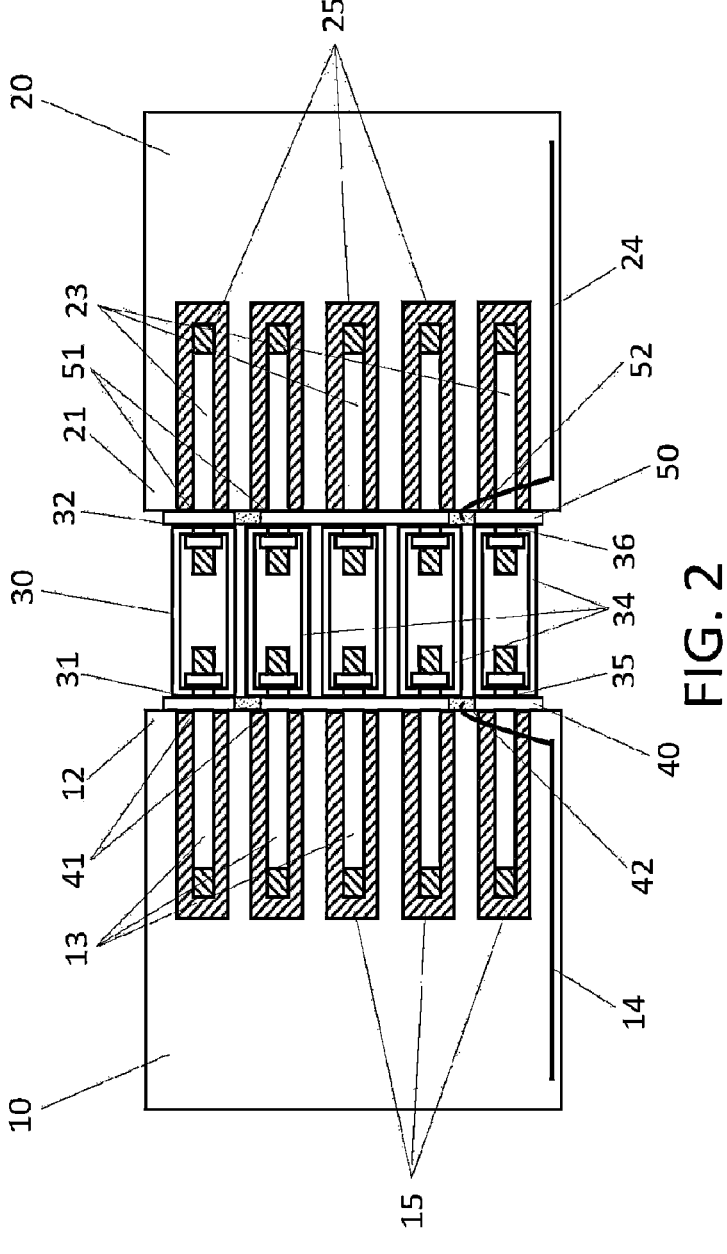
FIG. 2 shows an example of a metallic joint that joins the two sections of a segmented wind turbine blade.

FIG. 2 shows an example of the metallic joint 30 connecting the sections 10 and 20 of the blade via bolts 13 and 23. As shown in FIG. 2, a first metallic piece 40 may be placed between the rear end 12 of the first blade section 10 and the front flange 31 of the metallic joint 30, the first metallic piece 40 may be electrically connected with the first lightning down conductor 14 and with the front flange 31 of the metallic joint 30. A second metallic piece 50 may be placed between the front end 21 of the second blade section 20 and the rear flange 32 of the metallic joint 30, the second metallic piece 50 may be electrically connected with the second lightning down conductor 24 and with the rear flange 32 of the metallic joint 30, thus a lightning current path is established between the lightning down conductors 14 and 24 through the metallic pieces 40 and 50 and the metallic joint 30.

Metallic pieces 40 and 50 may be sandwiched between the end 12 or 21 of the respective section 10 or 20 of the blade and the respective flange 31 or 32 of the metallic joint 30. Thus, the metallic pieces 40 and 50 are in contact with the metallic joint 30 and no cables or other connection elements is required for establishing the electrical connection between the elements. The electrical connection is established by contact.

The metallic joint 30 may be a single piece attaching the sections 10 and 20 of the blade as shown in the example of FIG. 1, or the metallic joint 30 may have several pieces.

For example, FIG. 2 shows a metallic joint 30 which may comprise several independent metallic parts 34. Each metallic part 34 may have a front flange 35 and a rear flange 36. The front flange 35 of each metallic part 34 may be attached to the first blade section 10 with a bolt 13 of the first group of bolts 13, and the rear flange 36 of each metallic part 34 may be attached to the second blade section 20 with a bolt 23 of the second group of bolts 23. The front flanges 35 of the metallic parts 34 may be electrically connected with the first metallic piece 40 and the rear flanges 36 of the metallic parts 34 may be electrically connected with the second metallic piece 50. Therefore, the metallic pieces 40 and 50 may allow to have all the metallic parts 34 of the metallic joint equipotentialized.

As stated below, metallic pieces 40 and 50 may be sandwiched between the end 12 or 21 of the respective section 10 or 20 of the blade and the respective flange 35 or 36 of the metallic parts 34 of the metallic joint 30.

According to the example of FIG. 2, the independent metallic parts 34 of the metallic joint 30 may be spaced from each other to be mechanically independent from the other parts 34 of the metallic joint 30.

Also as shown in the example of FIG. 2, the rear end 12 of the first blade section 10 may have a first group of inserts 15 of conductive material for receiving the first group of bolts 13, and the front end 21 of the second blade section 20 may have a second group of inserts 25 of conductive material for receiving the second group of bolts 23. The first metallic piece 40 may be electrically connected with the first group of inserts 15, and the second metallic piece 50 may be electrically connected with the second group of inserts 25. Therefore, the metallic pieces 40 and 50 may also allow to have all the inserts 15 and 25 of conductive material equipotentialized.

As illustrated in example of FIG. 2, the metallic pieces 40 and 50 may be sandwiched between the inserts 15 or 25 of the respective section 10 or 20 of the blade and the respective flange 31 or 32 of the metallic joint 30. Thus, the metallic pieces 40 and 50 are in contact with the metallic joint 30 and with the inserts 15 and 25, and no cables or other connection elements is required for establishing the electrical connection between the elements.

The metallic parts 34 of the metallic joint may have two flanges 35 and 36 with passing holes for attaching the bolts 13 and 23, and two ribs 37 and 38 connecting the two flanges 35 and 36. The metallic parts 34 may also comprise an outer surface which provides rigidity, the outer surface may have a window 39 to allow access to the interior of the metallic part 34 for threading the bolts. (See example of FIG. 5). All parts 34 can be identical, but they do not have to be so.

The metallic pieces 40 and 50 may be flat rectangular metallic pieces slightly bent to match the outer shape of the blade. The metallic pieces 40 and 50 may have holes 41 and 51 for receiving the bolts 13 and 23 and terminal points 42 and 52 for establishing an electrical connection with the lightning down conductors 14 and 24. (See example of the FIG. 4).

Wind blades are usually manufactured in two shells that are assembled to form the finished blade. According to this, each blade section 10 and 20 of the segmented blade may have an upper shell 16 and 26 and a lower shell 17 and 27.

Figure 3:
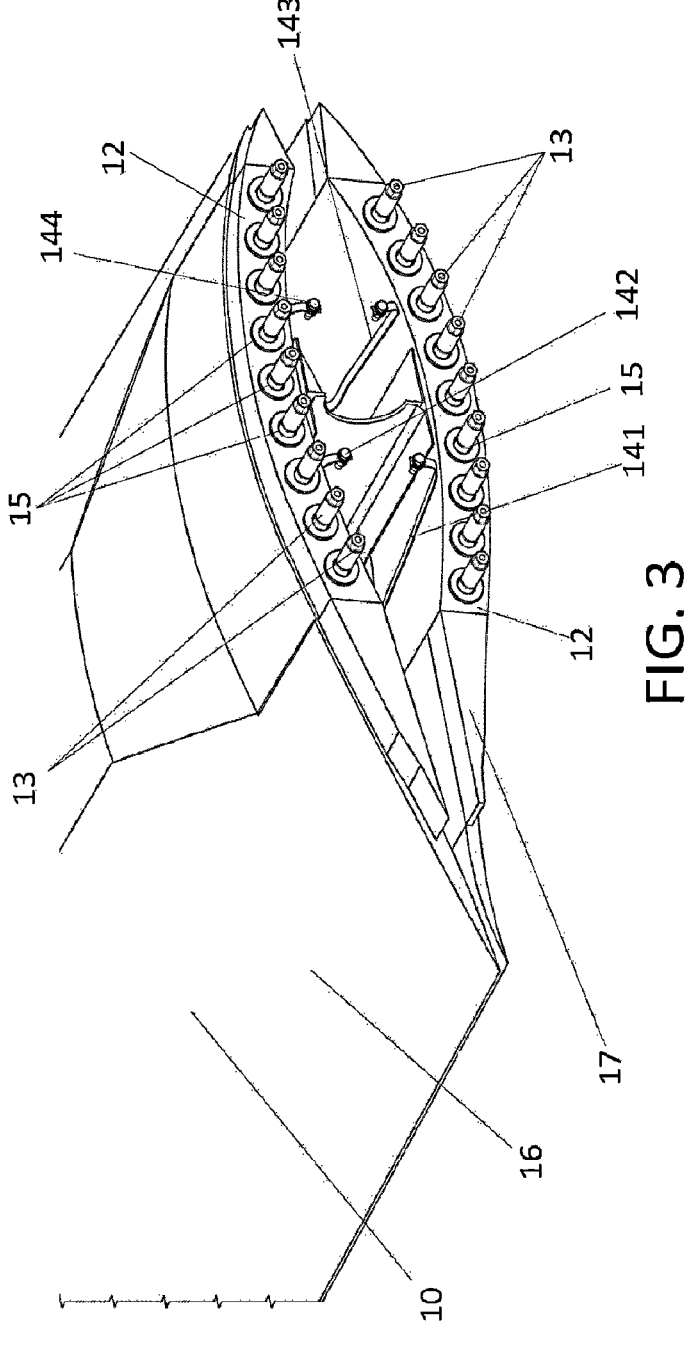
FIG. 3 shows a partial view of an example of a segmented blade showing the two shells of the first blade section with two lightning down cables per shell.
Figure 4:
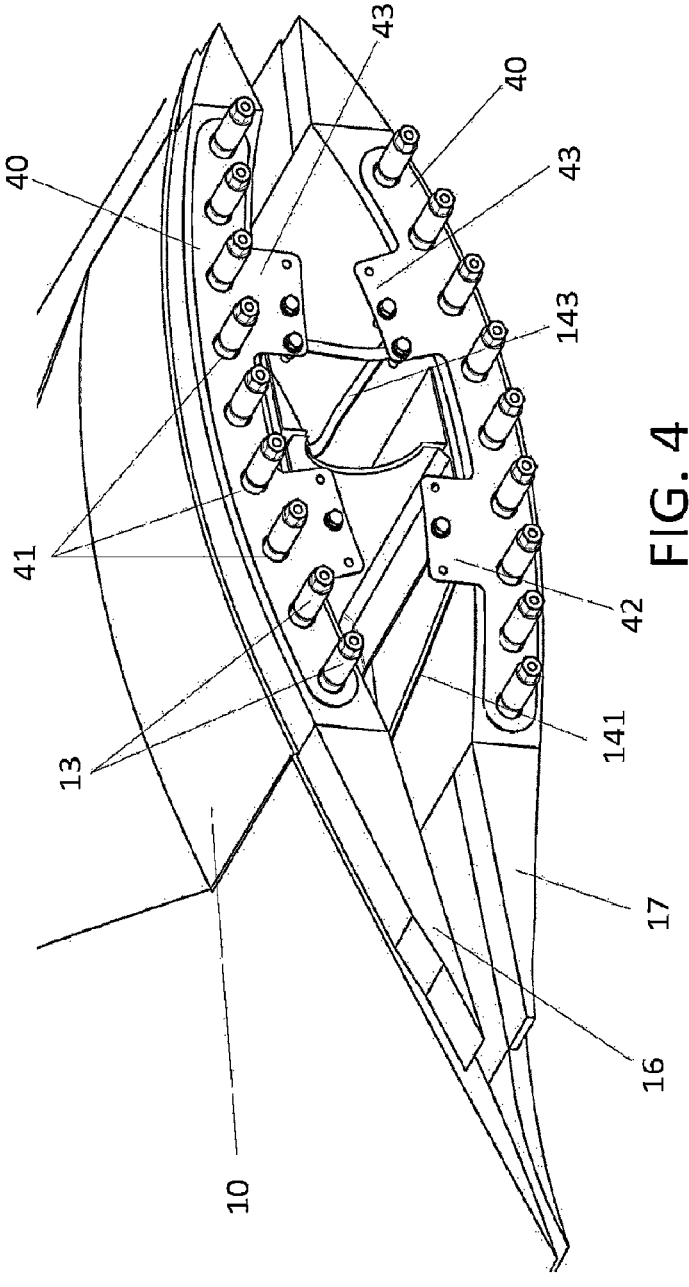
FIG. 4 shows the segmented blade of FIG. 3 with the metallics pieces placed onto the rear end of the first blade section and the lightning down cables connected to the metallic pieces.
Figure 5:
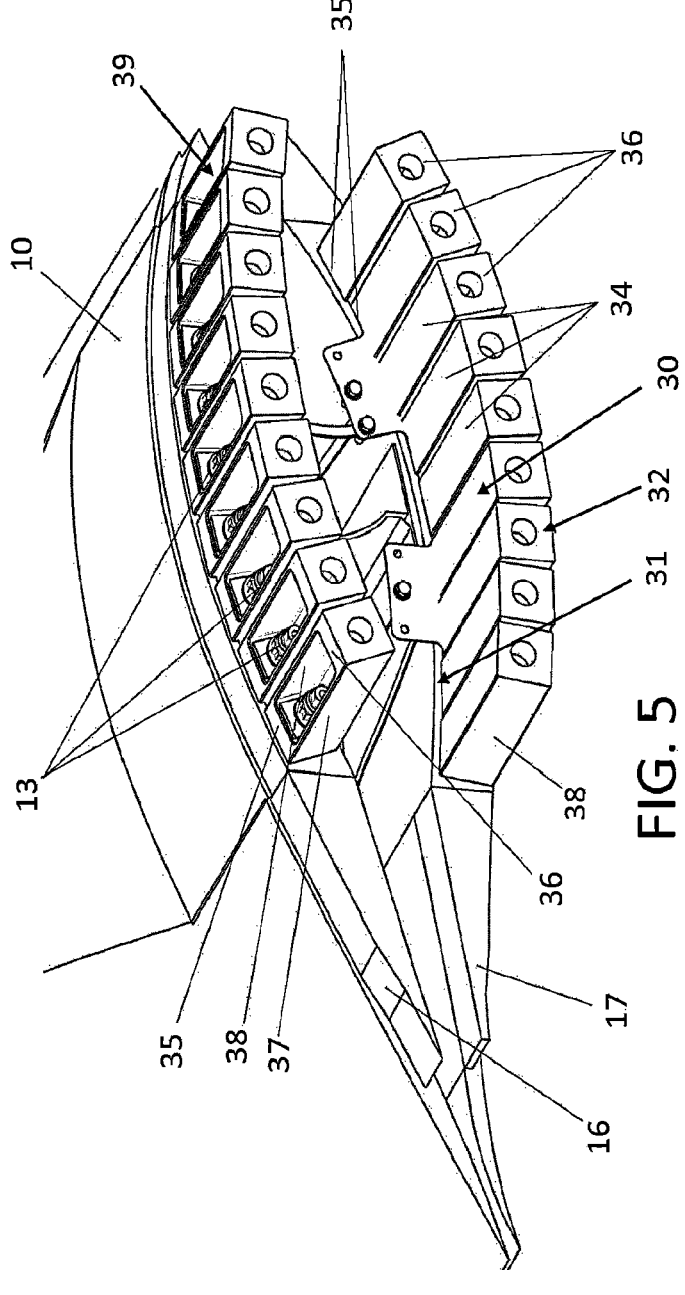
FIG. 5 shows the segmented blade of FIGS. 3 and 4 with the metallic joint attached via bolts to the rear end of the first blade section.

FIGS. 3, 4 and 5 show an example of a segmented wind turbine blade having two shells per section, however due to clarity in the figures, only the first section 10 of the blade is depicted in the figures, the second blade section 20 being symmetric.

The upper shells 16 and 26 may be attached with an upper metallic joint 30 and the lower shells 17 and 27 may be attached with a lower metallic joint 30. The first lightning down conductor 14 may be electrically connected with the front flange 31 of the upper or the lower metallic joint 30 and the second lightning down conductor 24 may be electrically connected with the rear flange 32 of the upper or the lower metallic joint 30, and the upper and lower metallic joints 30 may be electrically connected between them. Note that lightning down conductors can be indistinctly connected with the upper or lower metallic joint 30, and the current lightning path between the lightning down conductors is assured because the metallic joints 30 are connected between them.

Figure 6:
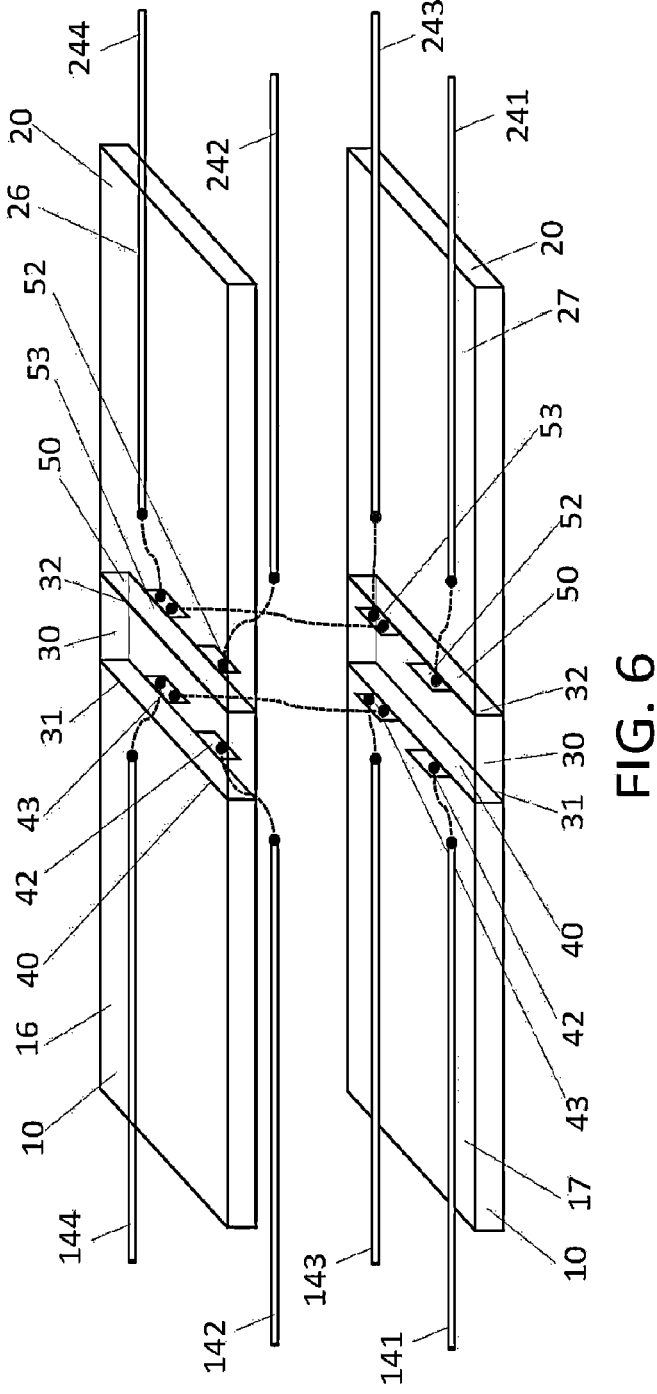
FIG. 6 shows a schematic diagram of an example for connecting the lightning down cables to the metallic pieces in a segmented blade with two shells per section blade.

In an embodiment, as shown in schematic example of FIG. 6, and also in FIGS. 3 and 4, four lightning down cables may be used per blade section and specifically two per shell. The first lightning down conductor 14 may comprise four lightning down cables 141, 142, 143 and 144, two of them 141 and 143 electrically connected with the front flange 31 of the lower metallic joint 30 and the other two 142 and 144 electrically connected with the front flange 31 of the lower metallic joint 30, and the second lightning down conductor 24 may comprise other four lightning down cables 241, 242, 243 and 244, two of them 241 and 243 electrically connected with the rear flange 32 of the lower metallic joint 30 and the other two 242 and 244 electrically connected with the rear flange 32 of the lower metallic joint 30. The front flanges 31 of the upper and lower metallic joints 30 may be electrically connected between them, and the rear flanges 32 of the upper and lower metallic joints 30 may also be electrically connected between them.

Each metallic piece 40 or 50 has two terminal points 42 and 43, or 52 and 53 for establishing an electrical connection with the lightning down cables.

In an embodiment, the two terminal points 42 and 43, or 52 and 53 of each metallic piece 40 or 50 are misaligned with each other and shifted an equal distance with respect to the center of the metallic piece 40 or 50 in order to balance the lightning current.

In an embodiment, one of the two terminal points 43 or 53 establish an electrical connection with a respective metallic piece 40 or 50.

More specifically, and as it is clearly shown in FIG. 6, on one hand, the first lightning down cable 141 is connected with the first terminal 42 of the lower metallic piece 40 of the lower shell 17 of first section 10, and the third lightning down cable 143 is connected with the second terminal 43 of the lower metallic piece 40 of the lower shell 17 of first section 10. On the other hand, the second lightning down cable 142 is connected with the first terminal 42 of the upper metallic piece 40 of the upper shell 16 of first section 10, and the fourth lightning down cable 144 is connected with the second terminal 43 of the upper metallic piece 40 of the upper shell 16 of first section 10.

The second terminal 43 of the upper metallic piece 30 of the upper shell 16 of first section 10 is connected with the second terminal 43 of the lower metallic piece 30 of the lower shell 17 of first section 10.

A symmetric distribution is established for the four lightning down cables 241, 242, 243 and 244 and the upper and lower metallic pieces 50 of the upper 26 and lower shell 27 of the second blade section 20.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A lightning protection system for segmented wind turbine blades, the system comprising a first blade section having a front end and a rear end, a second blade section having a front end and a rear end 34, and a metallic joint having a front flange and a rear flange, the rear end of the first blade section is attached to the front flange of the metallic joint with a first group of bolts and the front end of the second blade section is attached to the rear flange of the metallic joint with a second group of bolts, the first blade section has a first lightning down conductor extending from the front end to the rear end of the first blade section, and the second blade section has a second lightning down conductor extending from the front end to the rear end of the second blade section, wherein the first lightning down conductor is electrically connected with the front flange of the metallic joint and the second lightning down conductor is electrically connected with the rear flange of the metallic joint, thus a lightning current path is established between the lightning down conductors through the metallic joint, wherein a first metallic piece having holes for receiving the first group of bolts is placed between the rear end of the first blade section and the front flange of the metallic joint, the first metallic piece is electrically connected with the first lightning down conductor and with the front flange of the metallic joint, and a second metallic piece having holes for receiving the second group of bolts is placed between the front end of the second blade section and the rear flange of the metallic joint, the second metallic piece is electrically connected with the second lightning down conductor and with the rear flange of the metallic joint, thus a lightning current path is established between the lightning down conductors through the metallic first piece and the second piece and the metallic joint.

2. The system according to claim 1, wherein the metallic joint comprises several independent metallic parts, each metallic part has a front flange and a rear flange, the front flange of each metallic part is attached to the first blade section with a bolt of the first group of bolts, and the rear flange of each metallic part is attached to the second blade section with a bolt of the second group of bolts, and the front flanges of the metallic parts are electrically connected with the first metallic piece and the rear flanges of the metallic parts are electrically connected with the second metallic piece.

3. The system according to claim 2, wherein the independent metallic parts of the metallic joint are spaced from each other.

4. The system according to claim 2, wherein the independent metallic parts comprises the two flanges with passing holes for attaching the bolts and two ribs connecting the two flanges.

5. The system according to claim 1, wherein the rear end of the first blade section has a first group of inserts of conductive material for receiving the first group of bolts, and the front end of the second blade section has a second group of inserts of conductive material for receiving the second group of bolts, the first metallic piece is electrically connected with the first group of inserts, and the second metallic piece is electrically connected with the second group of inserts.

6. The system according to claim 1, wherein each blade section has an upper shell and a lower shell, the upper shells are attached with an upper metallic joint and the lower shells are attached with a lower metallic joint, the first lightning down conductor is electrically connected with the front flange of the upper or the lower metallic joint and the second lightning down conductor is electrically connected with the rear flange of the upper or the lower metallic joint, and the upper and lower metallic joints are electrically connected between them.

7. The system according to claim 6, wherein the first lightning down conductor comprises four lightning down cables, two of them electrically connected with the front flange of the lower metallic joint and the other two electrically connected with the front flange of the upper metallic joint, and the second lightning down conductor comprises other four lightning down cables, two of them electrically connected with the rear flange of the lower metallic joint and the other two electrically connected with the rear flange of the upper metallic joint, and the front flanges of the upper and lower metallic joints are electrically connected between them, and the rear flanges of the upper and lower metallic joints are electrically connected between them.

8. The system according to claim 7, wherein each metallic piece of the first metallic piece and second metallic piece has two terminal points for establishing an electrical connection with the lightning down cables.

9. The system according to claim 8, wherein the two terminal points of each metallic piece of the first metallic piece and second metallic piece are misaligned with each other, and shifted an equal distance with respect to the center of each of the first metal piece and second metallic piece.

10. The system according to claim 8, wherein one of the two terminal points of a metallic piece establish an electrical connection with a respective terminal point of another metallic piece.

* * * * *